United States Patent
Ja et al.

(10) Patent No.: US 7,324,199 B2
(45) Date of Patent: Jan. 29, 2008

(54) SYSTEM AND DECONVOLUTION PROCESS FOR AN OPTICAL FILTERING DEVICE BASED ON WGM RESONANCE

(75) Inventors: Shiou-jyh Ja, Stillwater, OK (US);
Eric Towers, Stillwater, OK (US);
Robert Shelton, Stillwater, OK (US);
Brian Strecker, Stillwater, OK (US)

(73) Assignee: Nomadics, Inc., Stillwater, OK (US)

( * ) Notice: Subject to any disclaimer, the term of this patent is extended or adjusted under 35 U.S.C. 154(b) by 282 days.

(21) Appl. No.: 11/222,057

(22) Filed: Sep. 8, 2005

(65) Prior Publication Data
US 2007/0109550 A1 May 17, 2007

Related U.S. Application Data

(60) Provisional application No. 60/611,453, filed on Sep. 20, 2004.

(51) Int. Cl.
*G01N 21/25* (2006.01)
(52) U.S. Cl. ..................... 356/416
(58) Field of Classification Search ............ 356/416; 702/189
See application file for complete search history.

(56) References Cited

U.S. PATENT DOCUMENTS

| 6,661,950 | B1 * | 12/2003 | Strecker | 385/30 |
| 7,162,100 | B1 * | 1/2007 | Gregory | 382/280 |
| 2001/0021804 | A1 * | 9/2001 | Nadeau | 600/407 |
| 2002/0101587 | A1 * | 8/2002 | Wilson et al. | 356/328 |
| 2005/0086026 | A1 * | 4/2005 | LeGore et al. | 702/181 |

* cited by examiner

*Primary Examiner*—Gregory J. Toatley, Jr.
*Assistant Examiner*—Kara E Geisel
(74) *Attorney, Agent, or Firm*—Dunlap, Codding & Rogers, P.C.

(57) ABSTRACT

A system and method for detecting the optical spectrum of an optical input signal. The system includes a tunable optical filter having a microresonator that is tunable across a plurality of states and a processor. The input signal is coupled into the microresonator, which is continuously tuned across a spectral range that is narrow relative to the targeted detection range. Signal information such as center wavelength, power distribution, and power strength are extracted from the measured output intensities resulting from the interaction of the unknown input signal with the tunable resonator at various tuned states. The processor includes a transfer function database with the resonant spectra of the tunable optical filter at predefined states. The processor applies an iterative non-linear deconvolution algorithm, and preferably an accelerated Richardson-Lucy algorithm, to calculate the spectrum of the input signal using the transfer function information and the intensity measurements.

18 Claims, 7 Drawing Sheets

SYSTEM AND DECONVOLUTION PROCESS FOR AN OPTICAL FILTERING DEVICE BASED ON WGM RESONANCE

CROSS-REFERENCE TO RELATED APPLICATIONS

The present patent application claims priority to the provisional patent application identified by U.S. Ser. No. 60/611,453, filed Sep. 20, 2004; the entire content of which is hereby expressly incorporated herein by reference.

STATEMENT REGARDING FEDERALLY SPONSORED RESEARCH OR DEVELOPMENT

Not applicable.

SUMMARY OF THE INVENTION

In general, the present invention relates to a system and method for extracting or detecting an optical spectrum of a light signal. More particularly, but not by way of limitation, one embodiment of the present invention relates to an optical spectrum analyzer system having a tunable optical filter and a processor that utilizes a non-linear deconvolution process to calculate the spectrum of an input signal.

Preferably, the tunable optical filter of the optical spectrum analyzer includes a whispering gallery mode (WGM) microresonator with a unique quasi-periodical spectrum. The microresonator is tunable across a plurality of states by a tuning assembly controlled by the processor. In operation, an input signal is coupled into the microresonator of the tunable optical filter, which is preferably continuously tuned across a spectral range that is narrow relative to the targeted detection range. A detector connected to the processor is used to read the output power or light intensities resulting from the interaction of the unknown input signal with the microresonator at the various tuned states, as measured by a detector.

The processor includes a transfer function database that stores a transfer function matrix associated with the tunable optical filter, which is indicative of the resonant spectra of the tunable optical filter at predefined states. The processor also has an embedded iterative non-linear deconvolution algorithm for calculating the spectrum of the input signal using the transfer function matrix and the detector light intensity measurements. Preferably, the non-linear deconvolution algorithm is based on an accelerated Richardson-Lucy algorithm.

DETAILED DESCRIPTION OF THE INVENTION

Figure 1:
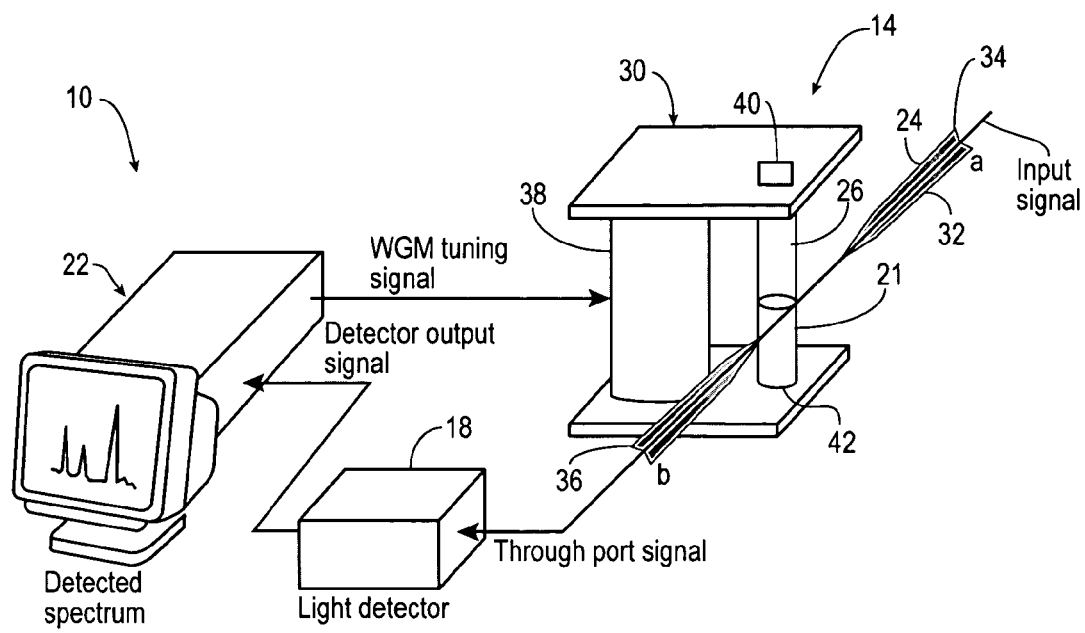
FIG. 1 is a perspective view of an optical spectrum analyzer system for detecting the optical spectrum of an input signal, which is constructed in accordance with the present invention.

Referring now to the drawings, and in particular to FIG. 1, shown therein is one embodiment of an optical spectrum analyzer system 10 for detecting an optical spectrum of an input signal, which is constructed in accordance with the present invention. The optical spectrum analyzer system 10 includes a tunable optical filter 14, a detector 18 and a processor 22.

The tunable optical filter 14 includes a waveguide 24, a microresonator 26, and a tuning assembly 30. In general, the waveguide 24 receives the input signal and conducts the input signal from point a to point b. The input signal is an optical or light signal, and preferably includes one or more narrow band signal. For example, the input signal can include several discrete narrow-band spectral features.

The waveguide 24 is disposed adjacent the microresonator 26 such that the waveguide 24 delivers the input signal to the proximity of microresonator 26, whereby the electromagnetic field of the input signal extends beyond the waveguide 24 and interacts with the microresonator 26. Certain wavelengths of light are resonant with whispering gallery modes (WGMs) that are supported by the microresonator 26. These wavelengths couple out of the waveguide 24 and into the microresonator 26 so that the wavelengths are attenuated in the input signal at point b. In other words, the waveguide 24 is evanescently coupled to the microresonator 26 such that supported whispering gallery mode resonance frequencies are extracted from the waveguide 24 and received into the microresonator 26 while light at frequencies not resonant with the microresonator 24 remain within the first waveguide 10. This effect occurs for a range of spacings between the waveguide 24 and the microresonator 26, including contact.

The evanescent coupling of a portion of the input signal to the microresonator 26 reduces the total optical energy passing point b, which is referred to herein as a through port signal. The through port signal may then be detected using the detector 18. Preferably, the output power of the through port signal (as the result of the interaction between the input signal and the microresonator 26) is observed and then processed by the deconvolution algorithm to determine signal information, such as a center wavelength, power distribution, and power strength. For example, if the input signal is assumed to have a Gaussian spectrum, the detected signal should be a Gaussian shaped curve with the correct center wavelength and distribution shape.

Figure 2:
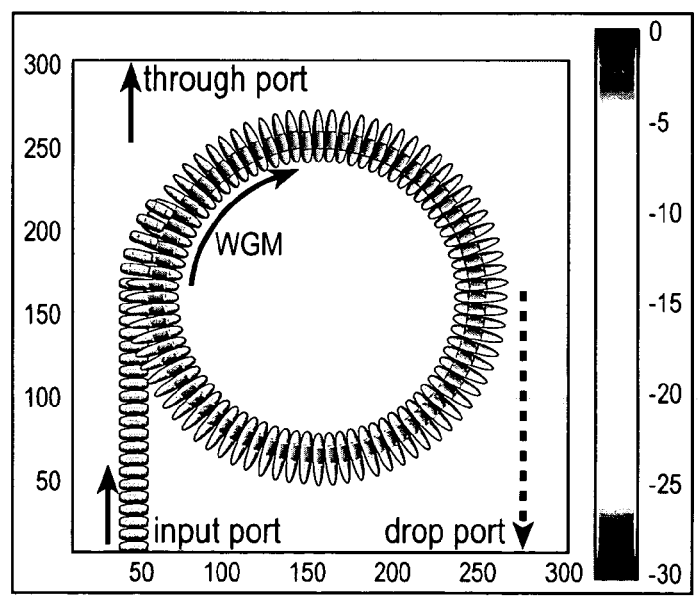
FIG. 2 is a top view of a waveguide-coupled high quality mode resonance of an exemplary micro-ring resonator.
Figure 3:
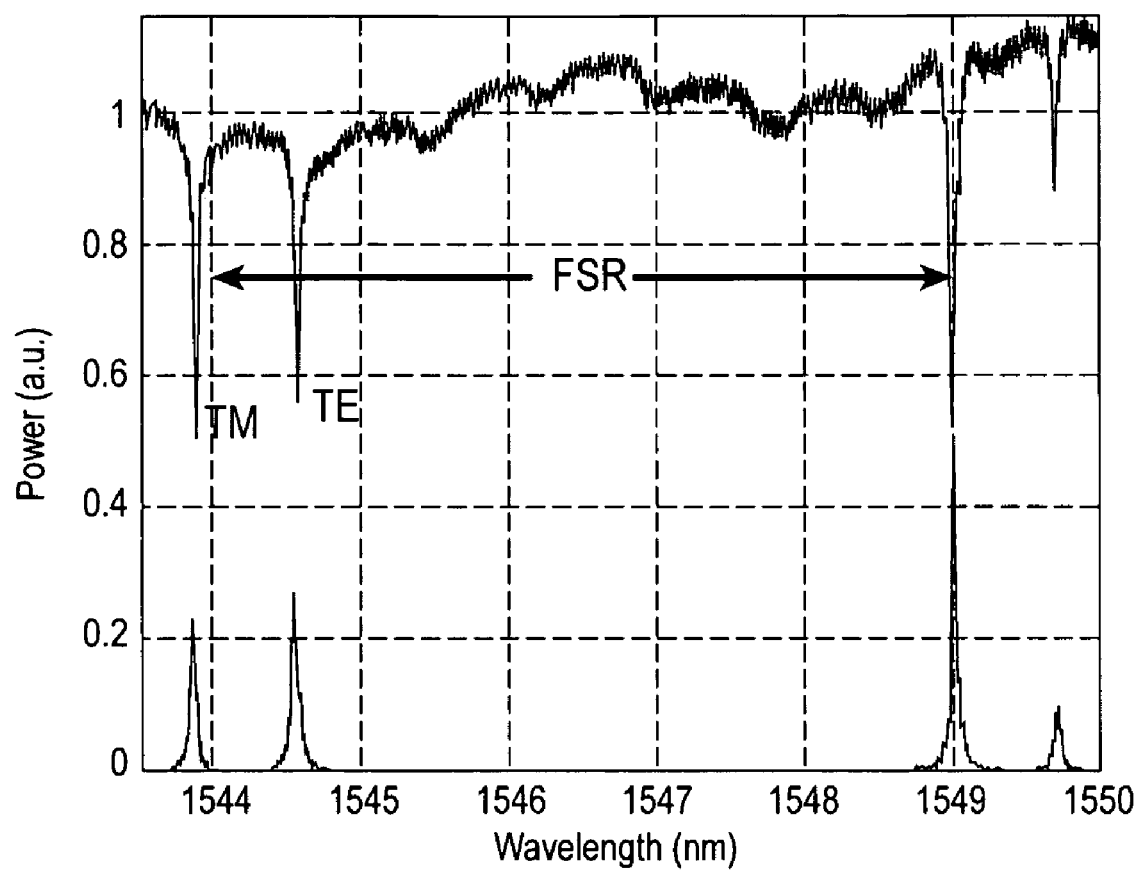
FIG. 3 is a plot of exemplary spectra of TE and TM modes at a through port (top trace) and a drop port (bottom trace) of the micro-ring resonator of FIG. 2.

Shown in FIG. 2 is a numerically simulated snapshot of a waveguide-coupled resonance produced by an exemplary micro-ring resonator with port notations for an input port, through port and drop port; and shown in FIG. 3 is an exemplary micro-ring resonator spectra of TE & TM modes at the through port (top trace) and the drop port (lower trace). The input signal at the through port has a null spectrum where the signal intensity drops at the resonance wavelength. On the contrary, the light at the drop port has a peak spectrum where intensity increases on resonance. Thus, it can be seen that either the null spectrum acquired from the through port or the peak spectrum acquired from the drop port can be detected in accordance with the present invention (although the present invention is generally described herein with reference to observing interaction between the input signal and the microresonator 26 at the through port).

Also, it should be noted that the spectrum of the micro-ring resonator is quasi-periodical. The spectral distances between each pair of adjacent fundamental resonance modes is roughly the same value, which is termed free spectral range (FSR). With a depolarized input light, two fundamental modes (TE and TM modes) may appear in one FSR. Because the responses of the TE and TM resonance modes to the same tuning force are generally different, additional polarization-dependent information is provided that can be used to extract polarization information of the input signal.

As discussed above, the tunable optical filter 14 of the optical spectrum analyzer system 10 includes the waveguide 24, the microresonator 26, and the tuning assembly 30. The waveguide 24 of the tunable optical filter 22 can be any structure capable of conducting an optical signal in accordance with the present invention. For example, the waveguide 24 can include an optical fiber, planar waveguide, prisms, or combinations thereof.

In one embodiment, as shown for example in FIG. 1, the waveguide 24 is an optical fiber 32 having a first end 34 and a second end 36. The input signal is fed or inputted into the first end 34 of the optical fiber 32, which delivers the input signal to the proximity of the microresonator 26. Preferably, the optical fiber 32 is brought to the side of the microresonator 26 and kept perpendicular to the microresonator 26. The optical fiber 16 can either be in contact with or be within a several hundred-nanometer gap away from an outside wall of the microresonator 26. Such close proximity allows the light to be "tunneled" or coupled between the optical fiber 32 and the microresonator 26. Also, in one embodiment, a section of optical fiber 32 proximate the microresonator 26 is tapered down in diameter in order to couple the evanescent field of the guided input signal with that of the microresonator 26. The second end 36 of the optical fiber 32 is disposed adjacent to the detector 18, which reads the power or light intensity of the through port signal outputted at the second end 36 of the optical fiber 32.

The microresonator 26 of the tunable optical filter 14 is a device constructed of an optically conducting dielectric material, such as for example silica. The microresonator 26 preferably has a high resonance quality mode (HQM), such as for example a resonance quality factor of at least 1,000. For a quality factor of between about 1,000 and about 1,000,000, with intensity detection resolution of 0.1%, the spectral detection resolution is about 1.5 pico-meters and 1.5 femto-meters, respectively.

In one embodiment, as shown for example in FIG. 1, the microresonator 26 of the tunable optical filter 22 is a cylindrical fiber resonator comprising a bare silica fiber, wherein a WGM resonance can be excited around its circumference. However, it should be understood that the microresonator 26 can be any WGM resonator, including for example a disk resonator, a cylindrical resonator, a spherical resonator, or a ring resonator. (See U.S. Pat. No. 6,661,950, entitled "Microresonator-Based Tuned Optical Filter"; M. L. Gorodetsky, A. A. Savchenkov, and V. S. Ilchenko, "Ultimate Q of optical microsphere resonators," Opt. Lett., 21, pp. 453, 1996; and V. B. Braginsky, M. L. Gorodetsky, V. S. Ilchenko, Phys. Lett. A 137, 393, 1989; the entire contents of which are hereby expressly incorporated herein by reference).

The design and construction of the microresonator 26 is generally dependent on the application of the optical spectrum analyzer system 10. For example, micro-ring resonators ranging from 5-100 μm in diameter are generally formed by a low-loss closed-loop waveguide, and hence are more compatible to planar lightwave circuit (PLC) technologies. (See B. E. Little, S. T. Chu, W. Pan, D. Ripin, T. Kaneko, Y. Kokubun, and E. Ippen, "Vertical coupled glass microring resonator channel dropping filter," IEEE Photonics Technology Letters, 11, 215, 1999; the entire content of which is hereby expressly incorporated herein by reference). PLC-based micro-ring resonators (such as those produced by Little Optics, Inc. of Annapolis Junction, Md.) share technical advantages similar to those of traditional WGM resonators while enjoying other advantages such as robust optical alignment, flexible inter-coupling scheme to form a composite resonator, and mass-producibility.

Further, while the present invention is generally discussed and shown herein with reference to one microresonator 26, it should be understood that parallel use of a plurality of microresonators 26 would permit the examination of broader wavelength ranges by lifting degenerate responses and eliminating uncertainties in the original input spectrum extraction process. When there are more than one microresonator 26, the tuning assembly can have the same or different tuning effect between the microresonators 26 (as discussed further below). Further, the one or more microresonators 26 of the optical filter 14 may be built upon other structures, such as for example gratings or other optical resonators.

The tuning assembly 30 of the tunable optical filter 14 is a device that tunes the microresonator 26. Tuning the microresonator 26 means that the optical path within the microresonator 26 is changed due to the change in either the physical geometry or optical properties of the microresonator 26 via the tuning assembly 30. In general, the tuning assembly 30 tunes the microresonator 26 by changing the microresonator's 26 environment. For example, the tuning assembly 30 can change a tension force, compression force, temperature, electric field, etc., experienced by the microresonator 26. As such, the tuning assembly 30 is capable of altering the microresonator's 26 refractive index and supported WGMs wavelengths. Therefore, it can be seen that the coupled-microresonator 26 and tuning assembly 30 act as a filter with a wavelength and environment dependent transfer function, which is referred to herein as an H matrix and denoted as H(λ, V) or [H].

In one embodiment, as shown for example in FIG. 1, the tuning assembly 30 utilizes tensile-tuning. In such an embodiment, the tuning assembly 30 includes a stretcher 38 mounted to a top end 40 and a bottom end 42 of the microresonator 26, which provides a stretching stress to tune the microresonator 26. For example, the stretcher 38 can be a piezo-electric actuator that expands upon an applied voltage (which is referred to herein as a tuning signal). However, it should be understood that the tuning assembly 30 can utilize any tuning method, including for example tensile-tuning, compression-tuning, temperature tuning, electromagnetic field tuning, or combinations thereof. (See U.S. Pat. No. 6,661,950).

The detector 18 of the optical spectrum analyzer system 10 can be any suitable optical detector capable of receiving the through port signal from the waveguide 24 and outputting a detector output signal indicative of the power or light intensity of the through port signal received. For example, the detector 18 can include a standard optical photodetector, such as an infrared (IR) photodetector. Further, the detector 18 can include a polarization control so that intensity measurements can be collected for the two orthogonal polarization modes for the input signal. As such, the distribution of the input signal between the defined polarization modes can be detected.

The processor 22 of the optical spectrum analyzer system 10 is responsible for the synchronization of the WGM tuning of the optical filter 14 and the output data recording from the detector 18. In general, the processor 22 of the optical spectrum analyzer system 10 repeatedly sweeps a predefined range of environment states used to alter the WGMs of the tunable optical filter 14 while monitoring the output of the tunable optical filter 14 (e.g., the through port signal) via the detector 18. The processor 22 also contains or has access to a transfer function database and embedded algorithms for processing the recorded detector output signals to generate a detected spectrum indicative of the spectral position and distribution of the input signal, as discussed in further detail below.

The processor 22 can be any suitable computer system, such as for example a CPU/microprocessor, a personal digital assistant (PDA) or any type of DSP circuit. In the embodiment depicted in FIG. 1, the processor 22 is electronically connected to the tuning assembly 30 of the tunable optical filter 14 so as to permit the processor 22 to transmit tuning signals to the tuning assembly 30. The processor 22 is also electronically connected the detector 18 so that the processor 22 can receive detector output signals from the detector 18. Preferably, the processor 22 also includes an output device, such as a monitor or printer, so that the detected spectrum for the input signal can be outputted in a format perceivable by a user.

Prior to the operation of the optical spectrum analyzer system 10 for spectrum detection, the transfer function H matrix associated with the optical filter 22 needs to be determined in a calibration process and stored in the transfer function database of the processor 22. In general, the H matrix contains data indicative of the resonance spectrum of the microresonator 26 of the tunable optical filter 14 at various tuned states, and as such provides essential information needed to extract the spectrum of an unknown input signal in a later detection process by the optical spectrum analyzer system 10.

More particularly, the transfer function H matrix is a collection of tuned composite HQM resonant spectra within the targeted detection spectral range. Each row of the H matrix is one HQM spectrum at a certain tuned state. By changing the tuned states, a series of WGM spectra can be generated, which is stored row-by-row in the H matrix. As such, the number of the composite spectra in the H matrix equals to the number of tuned states with each spectrum being recorded while the microresonator 26 is tuned to the corresponding state. The number of the wavelength bins equals the ratio of the target detection range to the wavelength resolution. The number of wavelength bins can be much greater than the number of tuned states.

Figure 4:
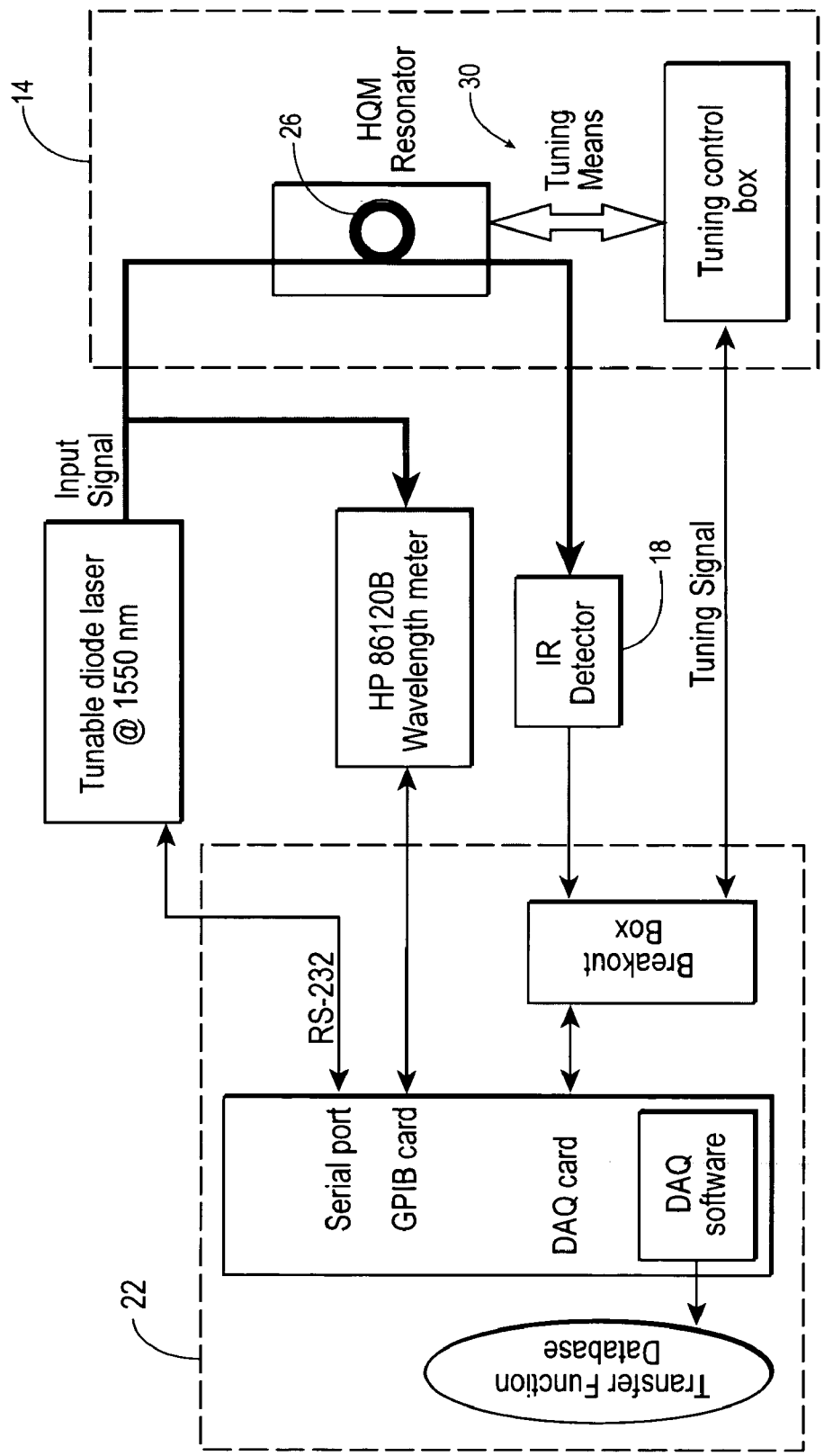
FIG. 4 is a block diagram of one embodiment of a calibration setup for the optical spectrum analyzer system.

Shown in FIG. 4 is one embodiment of a setup for the calibration process of the optical spectrum analyzer system 10. During the calibration process, narrow-band laser signals with known wavelengths are used as input signals, and the detector output signals from the detector 18 are recorded by the processor 22 as the processor 22 tunes the tunable optical filter 14 across a plurality of predefined states so as to generate the representative transfer function H matrix of the tunable optical filter 14. A unique H matrix is preferably constructed according to the specific or critical operating parameters of the optical spectrum analyzer system 10, which includes for example a resonator temperature, strain, spectrum detection range, and/or spectral resolution. If the operating parameters or conditions are violated in the detecting process (i.e., do not match the calibration conditions), the detected spectrum results may not be valid. Therefore, some environmental control means are typically required.

Figure 5:
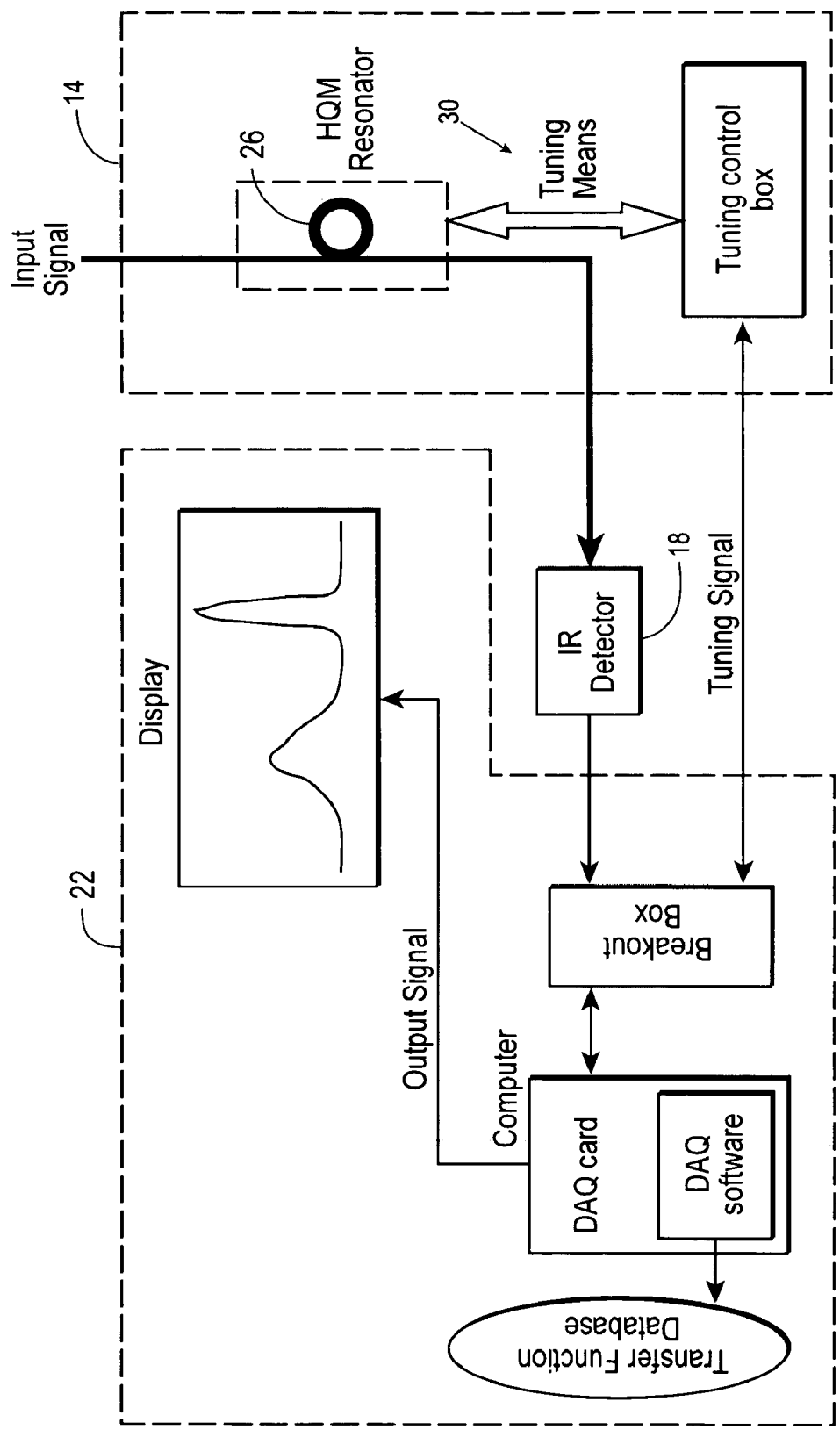
FIG. 5 is a block diagram of one embodiment of a detection setup for the optical spectrum analyzer system.

Shown in FIG. 5 is a block diagram of one embodiment of a setup for the signal detection process of the optical spectrum analyzer system 10. In the detection process, the input signal of an unknown spectrum is coupled with the microresonator 26 of the optical filter 14 (e.g., via evanescent wave coupling). The unknown spectrum of the input signal is denoted herein as $A(\lambda)$ wherein $\lambda$ is the wavelength. The column array [A] is the discretized form of the continuous analogue spectrum, so that:

$$[A]=[a_1 a_2 \ldots a_m]^T=[A(\lambda_1)A(\lambda_2) \ldots A(\lambda_m)]$$

where $\lambda_m$ is the wavelength of the m-th wavelength bin.

While the input signal interacts with the microresonator 26, the stretcher 38 of the tuning assembly 30 quickly stretches the microresonator 26 across a plurality of different strain states so as to effectively tune the microresonator 26 across a plurality of different WGM resonance states. For example, the tuning assembly 30 can tune the microresonator 26 across one hundred strain states as determined by the tuning signal outputted by the processor 22. The microresonator 26 is preferably tuned relatively quicker than the signal changing rate so that the spectrum of the input signal is assumed time invariant during the measurement.

The output power readings at the detector 18 resulting from the interaction of the input signal with the microresonator 26 at pre-defined tuned states state is recorded by the processor 22 into a vector array denoted herein as B(V), where V is the electric tuning signal specifying the tuned state and dictating the tuning force applied by the tuning assembly 30. It also can be discretized into a column array given as:

$$[B]=[b_1 b_2 \ldots b_n]^T=[B(V_1)B(V_2) \ldots B(V_n)]^T$$

where $V_n$ is the tuning signal of the n-th bin. The number of recorded detector output signals, i.e. the entries in the [B] array, can be much less than the number of wavelength bins of the detected spectrum.

After the [B] array is recorded with a complete tuning cycle, the processor 22 performs a deconvolution method for spectrum extraction using the [B] array and the transfer function H matrix. The outcome of deconvolution method is the detected spectrum of the input signal [A]. The detected spectrum can then be outputted via the at least one output device of the processor 22 for visualization, printing and/or communication.

Figure 6:
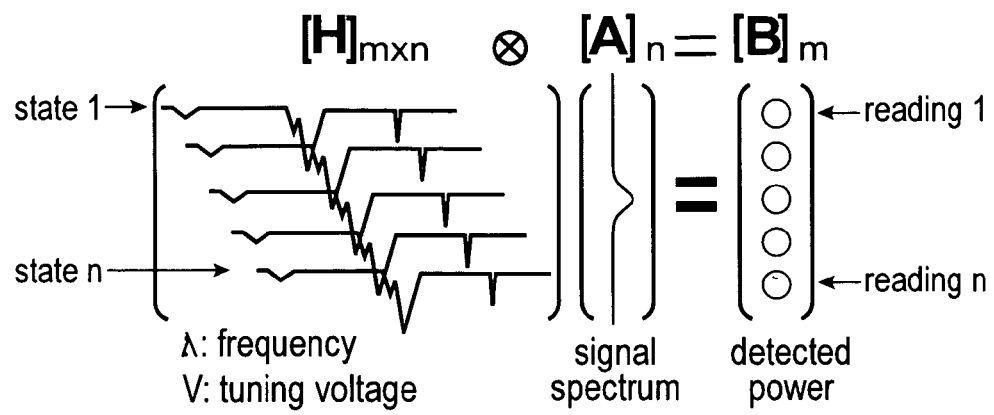
FIG. 6 show a representation of a structure of an H matrix and the relationship between the H matrix, an input spectrum, and a set of output power measurements for the optical spectrum analyzer system.

FIG. 6 shows the relationship between the H matrix, the input signal spectrum [A], and the detector output power measurement [B]. As can be seen, the detector output power array [B] is actually a convolution of the H matrix and the input spectrum array [A]. The sizes of the H matrix, [A], and [B] are denoted as M×N, N×1, and M×1, respectively. If the H matrix is square, i.e., M=N, then ideally the unknown spectrum array [A] can be found by matrix inversion. However, the matrix inversion approach often will not work in a practical situation due to the noise contamination of the H matrix. To make this task even more challenging, the H matrix is usually an underdetermined case, which means that N>M, and also the H matrix usually has rank deficiency. For example, an H matrix targeted to a 36-nm detection range with 3-pm resolution and 100 tuning states would have a 12000×100 structure. This is similar to solving a problem of 12,000 unknown parameters with only 100 equations. In such a case, the commonly used technique known as singular value decomposition (SVD) may not solve the problem correctly.

One approach to solving this problem may be to increase the number of tuned states by expanding the tunability of the microresonator 26 of optical filter 14 so that more information is available to solve the problem. However, high-quality WGM resonators are usually made of silica or other glass materials with low compressibility and a low strain-optical effect, and therefore have a limited strain tuning range. As such, the tunability of the microresonator 26 may exist in a small, sub-nanometer range, making it difficult to deconvolute signal spectra in applications having signals distributed in a wide spectral region (e.g., in a DWDM signal in the C- and L-band for the telecommunication industry or signals for multiple fiber optics sensors). In other words, it may be analytically impossible to solve the signal spectrum of more unknown parameters with less input parameters due to limited tunability of the microresonator 26.

Another approach to solve the problem is to form a dense quasi-periodic spectrum by grouping a plurality of microresonators 26 and coupling them together with a common input/output coupling light path. For example, multiple micro-ring resonators can be coupled to the same waveguide 24 in a planar optical circuit approach. The composite resonance of the plurality of microresonators 26 is an overlapping of multiple modes of resonance with spectral features interlacing with one another. The spectral spacing between adjacent modes is more controllable and hence the resulting transfer function matrix H can have higher degree of orthogonality among its column vectors.

Another way to resolve this technical challenge is to take advantage of the unique spectral features of WGM resonance. As mentioned before, the HQM spectrum of the microresonator 26 has a quasi-periodic structure. Taking the microresonator 26 to be a two-dimensional WGM resonator, such as micro-cylinder for example, each resonance can be labeled as (I, m) modes where the number/and m are the azimuthal and radial mode number, respectively. The spectral distance between two adjacent azimuthal modes (I and I+1), with the fundamental radial mode (m=1), is defined as the free spectral range (FSR). The value of FSR is not a fixed number and slowly changes with the increasing or decreasing I. Between the I and I+1 modes, there are higher radial modes with m>1 which are present within the FSR. The spectral relationship between the fundamental and each higher order radial mode is also changing with different azimuthal mode numbers. In other words, the higher order modes may change their relative position from one FSR to the next FSR. Such information allows the H matrix of a WGM resonance to be used to extract the input signal information even if the WGM resonance has not been tuned across a single FSR.

As such, a significant feature of the present invention is that the detection range of the optical spectrum analyzer system 10 is not limited by FSR at all, unlike traditional resonators such as a fiber bragg grating (FBG) or Fabry-Parot resonator which require tuning across one FSR to extract signal information. The detection ranges of such traditional resonators are also limited by their FSR due to the lack of rich high-order resonance features. Therefore, other periodic resonant spectrum formed by, for example, a Fabry Perot resonator, without a higher order mode, is preferably not used due to the ambiguity introduced by the simple periodic pattern associated therewith.

With the dense quasi-periodic spectra provided with the above mentioned approaches, the required HQM tuning range only needs to be greater than the largest spectral span between any two adjacent modes, which is usually much smaller than the targeted detecting spectral range.

The deconvolution process of the present invention is also a significant feature. In one embodiment, the detected spectrum of the input signal is calculated using a non-linear deconvolution algorithm. Preferably, the deconvolution algorithm is based on the Richardson-Lucy (RL) algorithm. The RL algorithm is widely used within the image processing community. By implementing similar principles for the optical spectrum analyzer system 10, the detected spectrum for the input signal can be determined with high resolution.

Figure 7:
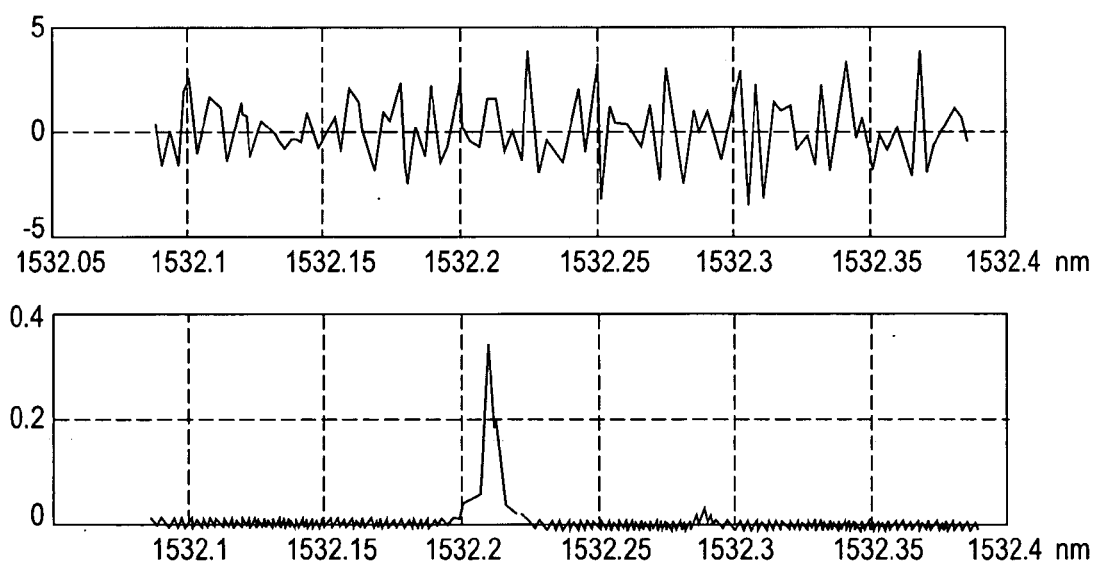
FIG. 7 is a graphical comparison of an exemplary detected spectrum of an input signal as calculated using an SVD algorithm (top) and as calculated using a Richardson-Lucy algorithm (bottom).

For example, shown in FIG. 7 is an exemplary detected spectrum determined by the SVD algorithm approach (the upper spectrum) and an exemplary detected spectrum determined by the RL algorithm approach (the lower spectrum). The actual input signal used to generate the detected spectrums depicted in FIG. 7 was a narrow-bandwidth laser located at about 1,532.22 nm. It can be seen that the detected spectrum determined by the RL algorithm approach correctly shows an impulse-like peak at the correct position, while the SVD algorithm approach results in a noise-like signal.

The RL algorithm is an iterative method, which means the extracted signal will be refined repeatedly or iteratively until certain completion criteria are met. While the RL algorithm can successfully extract signal information, its computation time may become quite long due to its slow convergence nature, especially for wide spectral detection range applications. Fortunately, several optimization techniques can be used to increase the convergence rate of the RL algorithm. (See Janson, P. A. (ed.), Deconvolution of Images and Spectra, Ch. 10, Academic Press, 1997; and Biggs, D. S. C. and Andrews, M., "Conjugate gradient acceleration of maximum-likelihood image restoration," Electronic Letters, 1995, 31, 1985-1986; the entire contents of which are hereby expressly incorporated herein by reference).

In one embodiment, the RL based algorithm used in the deconvolution process of the present invention is an accelerated Richardson-Lucy (ARL) algorithm defined by the equations:

$$a_n^{k+1} = a_n^k + \alpha \cdot \Delta a_n^k, \quad \text{where } \Delta a_n^k = a_n^k \left[ \frac{\sum_m \left( \frac{b_m}{b_m^k} - 1 \right) H_{mn}}{\sum_m H_{mn}} \right], \text{ and}$$

-continued $$\alpha = \sum_m \left\{ 1 - \frac{\sum_n H_{mn} a_n^k}{\hat{b}_m^k} \right\} \left( \frac{\sum_n H_{mn} \Delta a_n^k}{\hat{b}_m^k} \right) / \sum_m \left( \frac{\sum_n H_{mn} \Delta a_n^k}{\hat{b}_m^k} \right)^2, \text{ and}$$

$$\hat{b}_m^k = \sum_n H_{mn} a_n^k$$

where $\alpha_n$ is the acceleration factor, $H_{mn}$ is the m-by-n transfer function matrix, $\alpha_n^k$ is the calculated input spectrum at n-th wavelength after k-th iteration, and $b_m$ is the measured intensity output of the optical filter at m-th state. It can be seen that the ARL algorithm falls back to the standard RL algorithm when $[\alpha]$ is a unity array.

Figure 8:
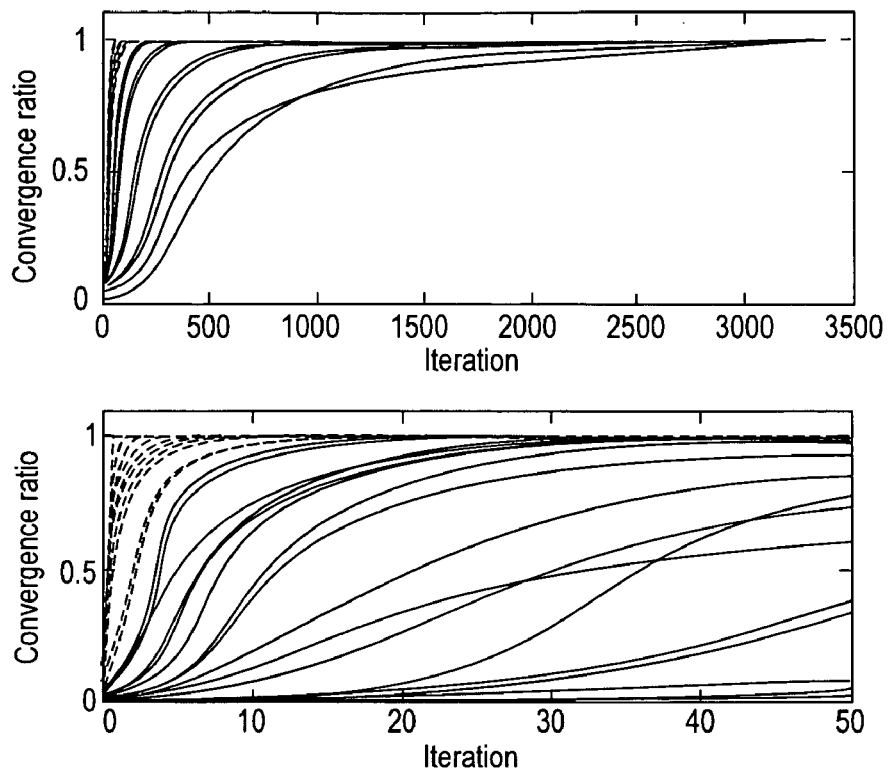
FIG. 8 is a graphical comparison of the extracted peak strength versus iteration number using a normal Richardson-Lucy algorithm (solid lines) and an accelerated Richardson-Lucy algorithm (dashed lines).

The time performance of the ARL algorithm approach compared to the standard RL algorithm approach is demonstrated by way of example in FIG. 8. In FIG. 8, the speed of convergence is graphically illustrated by a plot of the extracted peak strength versus the iteration number. The solid lines show the convergence curves acquired with the normal RL algorithm, and the dashed lines show the convergence curves acquired with the ARL algorithm (wherein the convergence curves were determined with several input laser wavelengths ranging from about 1530 nm to about 1547 nm).

During the deconvolution process, the peak strength of the detector output signal typically grows as the algorithm iterates and eventually converge to unity (since the input signal strength is normalized to the laser power used in the calibration stage). The ratio of the instantaneous peak value to its final converged value is denoted as convergence ratio. As it is shown in the plots, the convergence ratio quickly increases and then slows down as the signal converges.

As can be seen, the ARL algorithm approach is a preferred deconvolution method. While it might take up to about 3500 iterations of the normal RL algorithm to converge, it only takes about 40 iterations of the ARL algorithm to reach the same state. In other words, the runtime improvement of the ARL algorithm is almost two orders of magnitude. Also, the slowest convergence case using the ARL algorithm is almost equal to the fastest case using the RL algorithm.

Other non-linear deconvolution algorithms may work to successfully detect the signal.

It should be understood that the invention can be used in any application where it is desirable to determine the wavelengths in an optical signal. For example, because of the high spectral resolution and wide detection range obtainable through the present invention, the optical spectrum analyzer system 10 can be used in telecommunication applications for wavelength detection or as a spectrum analyzer. As a more particular example, the optical spectrum analyzer system 10 can be used as a channel monitor for dense wavelength division multiplexing (DWDM) in optical telecommunication networks. Also, the present invention can be implemented into WGM resonator-based sensing applications such as for example in a fiber Bragg grating (FBG) sensor, a Fabry Perot interferometer, or an HQM microresonator sensor. As a more particular example, when the WGM resonators are used as sensing elements, the signal extraction algorithm of the present invention can be used to detect the change of WGM resonance due to the presence of detecting phenomena. Further, development of fieldable spectrometers in the visible and near-infrared is also expected to benefit from the lack of moving parts and the ease of maintaining optical alignment of the present invention.

The following examples of the construction and performance of the present invention is set forth hereinafter. It is to be understood that the examples are for illustrative purposes only and is not to be construed as limiting the scope of the invention as described and claimed herein.

EXAMPLE 1

Micro-Cylinder Resonator Tunability/Detection Results

The tunability of a prototype system having an HQM micro-cylinder resonator has been measured by way of example. The micro-cylinder resonator is about 125-mm in diameter and is formed by a SMF-28 single mode fiber. Two-dimensional Whispering-Gallery Modes (WGMs) can be excited around the circumference of the fiber cross section. Both theoretical analysis and experimental tests have been performed to understand the maximum tunability of such a micro-cylinder prototype under strain tuning.

Axial stretching force was applied to the micro-cylinder resonator to achieve strain tuning. The theoretical tunability of this setup can be calculated by modeling the geometric and refractive index change due to the strain-optical effect. The non-isotropic strain-optical effect renders different tunability to the TM mode (transverse magnetic field to the cylinder axis) and the TE mode (transverse electric field to the cylinder axis). The ratio of tunability between the TE mode and the TM mode is about 1.9, which is verified with experimental results.

The spectral shifting estimated by theory is about 3 nm for the TE mode with a 3-mm resonator length made from SMF-28 fiber under 5000 micro-strain, which is close to the maximum shift of 2.46 nm observed in experiments with the specified conditions. Because the stretching tuning force is applied on an assembly for the microresonator consisting of silica fiber, glass solder, and a kovar ferrule, the strain will be distributed among these different parts. The ferrule has a Young's modulus value close to 140 GPa, which will propagate most of the strain onto other parts. The glass solder Young's modulus is 62 GPa, indicating that it is slightly softer than silica. Therefore, glass solder may cause less strain on the microresonator and hence, result in decreased WGM tunability.

By assuming that the fiber is the weakest part in the assembly, the SMF-28 fiber's rated strength can be used to compute the maximum WGM tuning range. The fiber will break at a micro-strain of 9,000 με. By linear extrapolation, a maximum WGM resonance shift of about 4.5 nm may be expected in the experiments. The practical WGM tuning should be much less than the maximum tunability to ensure the reliable operation of the device. Therefore, a sub-nanometer tuning range is a reasonable choice.

Figure 9:
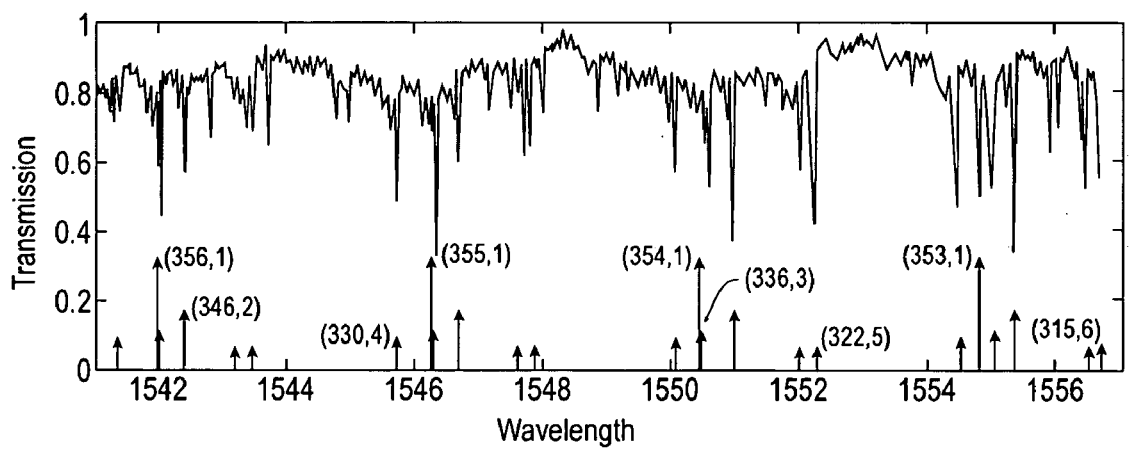
FIG. 9 is a exemplary through port spectrum of an example micro-cylinder resonator, wherein mode indices (I, m) are labeled for major position markers.

For the strain-tuned micro-cylinder made of SMF-28 fiber, a WGM null spectrum with resonance dips (where the through port signal power drops at every WGM resonant wavelength) was used in the interrogation. Shown in FIG. 9 is an exemplary through port spectrum of the SMF-28 fiber resonator. Mode indices (I, m) are labeled in FIG. 9 beside some major position markers.

A transfer function H matrix with a 20-nm spectral detection range and 100 tuning states is used for signal deconvolution. A two-dimensional graphical representation of the entries of the H matrix is shown at the bottom of FIG.

10, wherein the dashed lines stand for low values and the dotted lines stand for high values. The y-axis indicates the tuning percentage and the x-axis shows the wavelength.

It can be seen that as the tuning force (x-axis) increases, the axial strain on the fiber resonator increases, and the fiber circumference and the WGM resonance wavelength (y-axis) decreases. The dashed traces demonstrate the red-shifting of the WGM resonance features toward lower wavelengths upon stretching of the fiber resonator. There are also several "clusters" of WGM features in the H matrix. The distance between clusters is the free spectral range (FSR). The wavelength region inside a cluster is termed "in-cluster" and the region outside a cluster is termed "off-cluster.

The in-cluster regions are the wavelength regions where several WGM resonances are present and the shifting of modes cause some significant spectral features sweeping across that region. Input signals with wavelengths located in the in-cluster regions are generally easier to detect due to the rich information contained in the collected data. The off-cluster regions, on the other hand, are the spectral zone where no major features sweeps through it during tuning. As such, signals with wavelengths located in the off-cluster region are more difficult to detect due to the less significant features in the data.

In order to test the performance and stability of micro-cylinder prototype, laser signals at different wavelengths were systematically fed into the test system as input signals. The detection results are summarized and presented in FIG. 10. A total of 177 input signals with wavelengths ranging from about 1,530.1 nm to 1,547.7 nm with an approximate spacing of 0.1 nm were used in the test. The same test was run through the micro-cylinder prototype several times to evaluate performance reproducibility.

Figure 10:
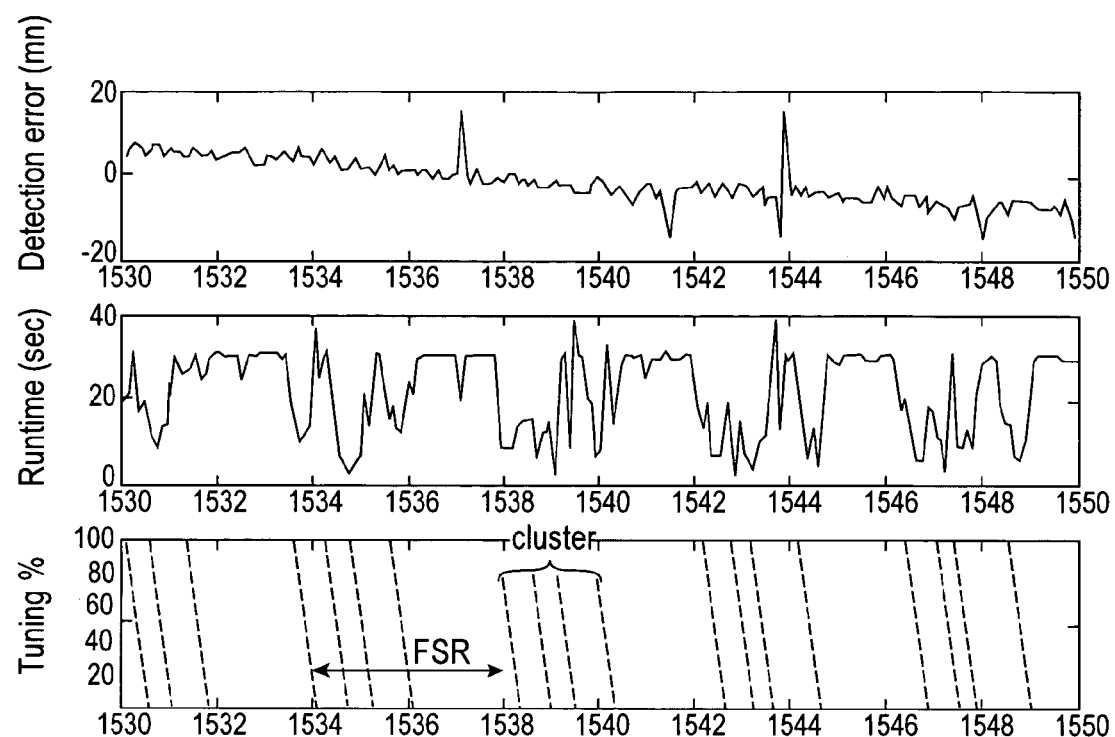
FIG. 10 is a plot of an exemplary H matrix (bottom), a plot of runtime in seconds versus wavelength (center), and a plot of detection error versus wavelength (top) for the example micro-cylinder resonator.

On average, there were about four wavelength detection errors greater than the 15-pm error threshold during each test. Interestingly, large detection errors tended to repetitively occur at four problematic wavelengths. The top plot of FIG. 10 shows the errors of wavelength extraction in one set of data. Almost all significant errors happened in the off-cluster region, where no major WGM resonance passes through the input laser wavelength during the whole tuning range. In this example, problem spots can be found at the proximity of 1537, 1541, 1544, and 1548 nm. The wavelengths located in the in-cluster regions were consistently detected correctly.

The runtime of the ARL algorithm was also recorded and plotted against the input wavelength, as shown in the middle plot of FIG. 10. It can be seen that it generally takes less time to detect the signals with wavelengths in the in-cluster region than to detect those in the off-cluster region. There is an iteration number limiter imposed in the ARL algorithm, which stops the iteration routine once the limit is reached. Most of the detections of signals within the off-cluster regions hit this limit and their detection times form an upper envelope on the runtime curve with satisfactory detection accuracy. By comparing the peak and runtime plot, the off-cluster regions can be easily recognized.

The performance of the micro-cylinder prototype is impressive. A 20 mm detection range was achieved with only 0.6 nm WGM tunability. With a larger tunability, it is expected that both the detection error and algorithm runtime can be reduced.

EXAMPLE 2

Micro-Ring Resonator Tunability/Detection Results

The tunability of a prototype having an HQM micro-ring resonator has been measured by way of example. The micro-ring resonator is formed by a close-looped rectangular waveguide made of a silica-based material and has a ring diameter of about 50 µm. The tunability of the micro-ring prototype has been measured with both temperature and isotropic hydraulic pressure tuning in a similar manner as discussed above for the micro-cylinder prototype. The experiment data show a temperature tuning rate of about 15 pm/° C. and a pressure tuning rate 50 pm/kpsi. The practical tuning rage is again sub-nanometer with a temperature range of 100° C. or a pressure range of 10 kpsi.

From the above description, it is clear that the present invention is well adapted to carry out the objects and obtain the advantages mentioned herein, as well as those inherent in the invention. In particular, in one embodiment, the present invention provides a high-resolution, cost effective, small form factor optical spectrum analyzer system. Further, the deconvolution method of the present invention makes HQM microresonator-based spectrometers realizable in practical applications (e.g., in telecommunication applications or multiplexed optical sensing networks), where the HQM resonance tuning range is much smaller than the spectral detection ranges since traditional deconvolution algorithms may be difficult to use if they require tunability comparable to the detection range.

Although the foregoing invention has been described in some detail by way of illustration and example for purposes of disclosure and clarity of understanding, it will be apparent to those skilled in the art that certain changes and modifications may be practiced without departing from the spirit and scope of the present invention, as described herein. Those skilled in the art will also appreciate that the conception upon which this disclosure is based may readily be utilized as a basis for the designing of other structures, methods, and systems for carrying out the several purposes of the present invention. As such, it should also be understood that the invention is not limited to the specific and preferred embodiments described herein, including the details of construction and the arrangements of the components as set forth in the above description or illustrated in the drawings. Further, it should be understood that the phraseology and terminology employed herein are for the purpose of description and should not be regarded as limiting.

What is claimed is:

1. A system for detecting an optical spectrum of an input signal, comprising:
   a tunable optical filter comprising:
      a microresonator having an optical pathlength and supporting whispering gallery modes, the optical pathlength of the microresonator being modifiable such that supported whispering gallery mode resonance frequencies are tunable;
      a waveguide for receiving the input signal, the waveguide being evanescently coupled to the microresonator such that supported whispering gallery mode resonance frequencies are extracted from the waveguide and received into the microresonator while light at frequencies not resonant with the microresonator remain within the waveguide; and
      a tuning assembly for modifying the optical pathlength of the microresonator in response to receiving a tuning signal;
   a detector for receiving light from the waveguide and generating detector output signals indicative of the light received from the waveguide; and
   a processor outputting tuning signals for controlling the tuning assembly and receiving a plurality of detector output signals from the detector as the tunable optical filter is tuned across a plurality of states while the input signal interacts with tunable optical filter, the processor further running a non-linear deconvolution algorithm for calculating a spectrum of the input signal using a transfer function matrix which is indicative of resonant spectra of the tunable optical filter at predefined states.

2. The system of claim 1, wherein the non-linear deconvolution algorithm is a Richardson-Lucy algorithm.

3. The system of claim 1, wherein the non-linear deconvolution algorithm is an accelerated Richardson-Lucy algorithm.

4. The system of claim 3, wherein the non-linear deconvolution algorithm is given by the equations:

$$a_n^{k+1} = a_n^k + a \cdot \Delta a_n^k, \text{ where } \Delta a_n^k = a_n^k \left[ \frac{\sum_m \left( \frac{b_m}{\hat{b}_m^k} - 1 \right) H_{mn}}{\sum_m H_{mn}} \right] \text{ and}$$

$$a = \sum_m \left( 1 - \frac{\sum_n H_{mn} a_n^k}{\hat{b}_m^k} \right) \left( \frac{\sum_n H_{mn} a_n^k}{\hat{b}_m^k} \right) / \sum_m \left( \frac{\sum_n H_{mn} a_n^k}{\hat{b}_m^k} \right)^2 \text{ and}$$

$$\boxed{\hat{b}_m^k = \sum_n H_{mn} a_n^k}$$

where $\alpha_n$ is the acceleration factor, $H_{mn}$ is the m-by-n transfer function matrix, $\alpha_n^k$ is the calculated input spectrum at n-th wavelength after k-th iteration, and $b_m$ is the measured intensity output of the optical filter at m-th state.

5. The system of claim 1, wherein the microresonator of the tunable optical filter has a dense quasi-periodic composite resonant spectrum.

6. The system of claim 5, wherein the dense quasi-periodic resonant spectrum of the microresonator has a spacing between consecutive modes that is less than a tuning range of the microresonator.

7. The system of claim 1, wherein the microresonator of the tunable optical filter has a high resonance quality mode.

8. The optical spectrum analyzer of claim 7, wherein the microresonator has a resonance quality factor of at least 1,000.

9. The system of claim 1, wherein the microresonator is selected from a group consisting of a disk resonator, a cylindrical resonator, a spherical resonator, and a ring resonator.

10. The system of claim 1, wherein the tunable optical filter comprises a plurality of microresonators.

11. The system of claim 10, wherein the plurality of microresonator are micro-ring resonators formed by a plurality of interlacing, close-looped waveguiding structures.

12. The optical spectrum analyzer of claim 1, wherein the tuning assembly tunes the microresonator by changing at least one of the physical geometry or the refractive index properties of the microresonator.

13. The system of claim 1, wherein the tuning assembly tunes the microresonator by applying at least one of a heat source, a cooling source, a stretching force, a compression force, or an electric field to the microresonator.

14. The optical spectrum analyzer of claim 1, wherein the detector includes a polarization control.

15. A method for generating a spectrum of an input signal, the method comprising:
receiving a plurality of intensity measurements collected from a tunable optical filter as the tunable optical filter is tuned across a plurality of states while the input signal interacts with tunable optical filter;
receiving a transfer function matrix associated with the tunable optical filter; and
applying a non-linear deconvolution algorithm with the transfer function matrix to the plurality of intensity measurements to calculate the spectrum of the input signal.

16. The system of claim 15, wherein the non-linear deconvolution algorithm is a Richardson-Lucy algorithm.

17. The system of claim 15, wherein the non-linear deconvolution algorithm is an accelerated Richardson-Lucy algorithm.

18. The system of claim 17, wherein the non-linear deconvolution algorithm is given by the equations:

$$a_n^{k+1} = a_n^k + a \cdot \Delta a_n^k, \text{ where } \Delta a_n^k = a_n^k \left[ \frac{\sum_m \left( \frac{b_m}{\hat{b}_m^k} - 1 \right) H_{mn}}{\sum_m H_{mn}} \right] \text{ and}$$

$$a = \sum_m \left( 1 - \frac{\sum_n H_{mn} a_n^k}{\hat{b}_m^k} \right) \left( \frac{\sum_n H_{mn} a_n^k}{\hat{b}_m^k} \right) / \sum_m \left( \frac{\sum_n H_{mn} a_n^k}{\hat{b}_m^k} \right)^2 \text{ and}$$

$$\boxed{\hat{b}_m^k = \sum_n H_{mn} a_n^k}$$

where $\alpha_n$ is the acceleration factor, $H_{mn}$ is the m-by-n transfer function matrix, $\alpha_n^k$ is the calculated input spectrum at n-th wavelength after k-th iteration, and $b_m$ is the measured intensity output of the optical filter at m-th state.

* * * * *

UNITED STATES PATENT AND TRADEMARK OFFICE
CERTIFICATE OF CORRECTION

PATENT NO. : 7,324,199 B2
APPLICATION NO. : 11/222057
DATED : January 29, 2008
INVENTOR(S) : Shiou-jyh Ja et al.

It is certified that error appears in the above-identified patent and that said Letters Patent is hereby corrected as shown below:

In the Specification:
Column 2, line 37: After "narrow band" delete "signal" and replace with -- signals --.

Column 2, line 53: After "microresonator" delete "24" and replace with -- 26 --.

Column 2, line 54: Before "waveguide" delete "first".

Column 2, line 54: After "waveguide" delete "10" and replace with -- 24 --.

Column 3, line 32: After "optical filter" delete "22" and replace with -- 14 --.

Column 4, line 8: Delete "Left" and replace with -- Lett --.

Column 4, line 10: Delete "Left" and replace with -- Lett --.

Column 6, line 27: Delete the equation
"$[A] = [a_1\ a_2\ ...\ a_m]^T = [A(\lambda_1)\ A(\lambda_2)\ ...\ A(\lambda_m)]^T$"
and replace with -- $[A] = [a_1\ a_2\ ...\ a_n]^T = [A(\lambda_1)\ A(\lambda_2)\ ...\ A(\lambda_n)]^T$ --.

Column 6, line 29: Delete "$\lambda_m$" and replace with -- $\lambda_n$ --.

Column 6, line 29: Delete "*m-th*" and replace with -- *n-th* --.

Column 6, line 50: Delete the equation
"$[B] = [b_1\ b_2\ ...\ b_n]^T = [B(V_1)\ B(V_2)\ ...\ B(V_n)]^T$"
and replace with -- $[B] = [b_1\ b_2\ ...\ b_m]^T = [B(V_1)\ B(V_2)\ ...\ B(V_m)]^T$ --.

Column 6, line 52: Delete "$V_n$" and replace with -- $V_m$ --.

Column 6, line 52: Delete "*n-th*" and replace with -- *m-th* --.

Column 7, line 2: Delete "*MxN, Nx1,* and *Mx1,*" and replace with
-- *mxn, nx1,* and *mx1,* --.

UNITED STATES PATENT AND TRADEMARK OFFICE
CERTIFICATE OF CORRECTION

PATENT NO.      : 7,324,199 B2
APPLICATION NO. : 11/222057
DATED           : January 29, 2008
INVENTOR(S)     : Shiou-jyh Ja et al.

It is certified that error appears in the above-identified patent and that said Letters Patent is hereby corrected as shown below:

Column 7, line 3: Delete "$M=N$" and replace with -- $m=n$ --.

Column 7, line 9: Delete "N>M" and replace with -- m>n --.

Column 11, line 1-2: Delete "and the dotted lines stand for high values".

Column 11, line 56: After "20" delete "mm" and replace with -- nm --.

Signed and Sealed this

Twenty-fourth Day of June, 2008

JON W. DUDAS
*Director of the United States Patent and Trademark Office*